United States Patent [19]

Kalavitis

[11] Patent Number: 5,241,989
[45] Date of Patent: Sep. 7, 1993

[54] REDUCED HEIGHT DOUBLE FLAP DUST VALVE

[75] Inventor: Eini Kalavitis, Chazy, N.Y.

[73] Assignee: Plattco Corporation, Plattsburgh, N.Y.

[21] Appl. No.: 979,341

[22] Filed: Nov. 20, 1992

Related U.S. Application Data

[63] Continuation of Ser. No. 836,170, Feb. 18, 1992, abandoned, which is a continuation of Ser. No. 715,048, Jun. 12, 1991, abandoned, which is a continuation of Ser. No. 759,207, Sep. 7, 1990, abandoned, which is a continuation of Ser. No. 440,451, Nov. 22, 1989, abandoned, which is a continuation of Ser. No. 309,972, Feb. 13, 1989, abandoned, which is a continuation of Ser. No. 191,805, Apr. 26, 1988, abandoned, which is a continuation of Ser. No. 868,765, May 30, 1986, abandoned.

[51] Int. Cl.$^5$ .............................................. F16K 1/18
[52] U.S. Cl. ..................................... 137/613; 251/212; 137/242
[58] Field of Search ................... 251/226, 85, 212, 84, 251/87; 137/614.13, 613, 242, 243, 243.3

[56] References Cited

U.S. PATENT DOCUMENTS

| | | | |
|---|---|---|---|
| 1,051,872 | 2/1913 | Eirich | 251/212 X |
| 2,157,554 | 5/1939 | McFarlin | 251/212 X |
| 2,721,678 | 10/1955 | Gill | 251/212 |
| 2,852,036 | 9/1958 | Riza | 251/212 X |
| 3,410,422 | 11/1608 | Carpenter | 251/228 X |
| 3,417,961 | 12/1968 | Shorrock | 251/212 |
| 3,544,045 | 12/1970 | Butscher | 251/212 X |
| 3,799,502 | 3/1974 | Baum | 251/212 X |

Primary Examiner—John C. Fox
Attorney, Agent, or Firm—Lowe, Price, LeBlanc & Becker

[57] ABSTRACT

A reduced height dust valve is described which is used in a trap which utilizes a pair of said valves to remove dust from, for example, a vacuum line, is described. The valve includes a body having a longitudinal flow path, a valve seat detachably mounted in the upper portion of the body and opposed flapper plates which seat against each other to close the valve or are rotated downwardly by actuator shafts to open the valve. The flapper plates define adjacent edges which seat against each other by a sliding action permitted by movement of one of the two actuator arms.

5 Claims, 3 Drawing Sheets

REDUCED HEIGHT DOUBLE FLAP DUST VALVE

This application is a continuation of application Ser. No. 07/836,170 filed Feb. 18, 1992, which is a continuation of application Ser. No. 07/715,048 filed Jun. 12, 1991, which is a continuation of application Ser. No. 07/759,207 filed Sep. 7, 1990, which is a continuation of application Ser. No. 07/440,451 filed Nov. 22, 1989, which is a continuation of application Ser. No. 07/309,972 filed Feb. 13, 1989, which is a continuation of Ser. No. 07/191,805 filed Apr. 26, 1988, which is a continuation of application Ser. No. 06/868,765 filed May 30, 1986 all of which are now abandoned.

This invention relates to a dust valve system and more particularly to a double dump airlock valve having a reduced headroom requirement.

Double dump airlock valves have been known for many years, and find wide applications in for example mining, milling, processing, waste disposal and waste incineration operations. the valves are typically used in a vacuum system and pressure to remove particulate material and thereby protect the collection systems such as a bag house or the like. U.S. Pat. Nos. 3,257,045 and the improvement thereon No. 3,410,422, assigned to the assignee of this invention, describe typical prior art dust valve systems.

In order to maintain either a positive or negative pressurized system the valves are utilized in pairs. Particulate material will collect in the upper valve. The lower valve is initially closed when the upper valve is opened to dump the collected material onto the lower valve. The upper valve is then closed and the lower valve opened to remove the material from the system without affecting the pressure in the collection system. Flap valves are particularly well suited when the material is abrasive, at an increased temperature, or as noted above when the valve must function as an airlock. Maintenance costs of systems using such valves then are reduced because the particulate material is removed from the collection system before damage can be done to fans, cyclones, precipitators, duct work, piping and the like.

Prior art flap valves however have a major disadvantage. The valve height requires excessive headroom. Typically a valve having an 8 inch opening would have a height of from 21 to 32 inches. In many cases, then, flap valves cannot be used because of this headroom requirement. In some cases, rotary valves can be substituted for flap valves because rotary valves, for an eight inch opening, range in height from 12 to 19 inches. There are, however, certain applications as noted above in which the best performance can only be achieved with a flap valve.

In addition, when the valve system is used in an airlock, in for example, a vacuum conveyor system considerable torque may be required in order to open the valve flapper. This problem was addressed in U.S. Pat. No. 4,480,812 also assigned to the assignee of this application. In that patent an off center mounting was used to crack one edge of the flapper away from the seat initially before the entire flapper rotated away from the seat. Similarly, in U.S. Pat. No. 4,308,894, the flapper included the separate pressure release valve.

However, it has been discovered that the headroom requirement can be dramatically diminished by providing a double flapper design. Two flapper plates then close the valve opening, and may either be separately driven, or interconnected wherein one flapper plate is mounted on a driven shaft and the second flapper plate is mounted on a follower shaft. In addition, in one embodiment of this invention, a sliding action is provided wherein the twin flapper plates seat against each other at an edge, and as they seat or unseat at least one of the flapper plates slides laterally. The sliding action upon opening can assist in jarring bridged material and upon closing, as will be subsequently explained, the seating edges will be flushed of any residual particulate material so that an airtight seal will be formed.

In the valve embodiments of this invention actuating shafts are disposed in the upper portion of the valve body and a link or actuating arm connects each flapper plate to a respective shaft. The shafts are interconnected by a biased linkage so that rotation of one will rotate the other also. In this way the opening movement can be synchronized so that one flapper opens before the other, or they can open and close simultaneously.

In one embodiment of this invention the flapper plates seat against each other and against a separate seat. In this embodiment one plate closes before the other, and the latter has a tapered edge so that as it seats against the opposite flapper, it wipes the seating surface clean, and urges the flapper slightly laterally. As a result, when the action is reversed to open the valve, a sliding action by one flapper plate will result. This action can, as noted above, jar bridged particulate material loose.

In an alternate embodiment of this invention, a central divider seat is provided and both flapper plates seat against the divider plate rather than against each other. The divider plate is slightly angled at its seating surface so that the flapper plates do not touch each other.

In both embodiments of this invention headroom is dramatically diminished so that a double dump valve of this invention having an 8 inch opening therethrough, can be only half the height of standard flap valves. The height of the valve is essentially the length of one set of the twin flapper plates.

Accordingly it is an object of this invention to provide an airlock valve with substantially reduced headroom requirements.

It is another object of this invention to provide an airlock flap valve which opens and closes using twin flapper plates.

It is another object of this invention to provide a double flapper valve wherein the flappers are closed to seat against a central divider and peripheral seat member.

It is yet another object of this invention to provide a double flap, double dump valve system for an airlock wherein the height thereof is essentially the length of one set of the flapper plates and wherein the flappers open and close with synchronzied movements and are driven by a single drive means.

It is yet another object of this invention to provide a double flap, double dump valve system for an airlock wherein the twin flapper plates seat against each other at an edge with a sliding movement whereby one of the flapper plates is displaced substantially laterally by the closing action of the second flapper plate thereagainst.

This and other objects will become readily apparent with reference to the drawings and following description wherein FIG. 1 is a side view of a double dump valve system showing the flapper and seat in phantom.

Figure 1:
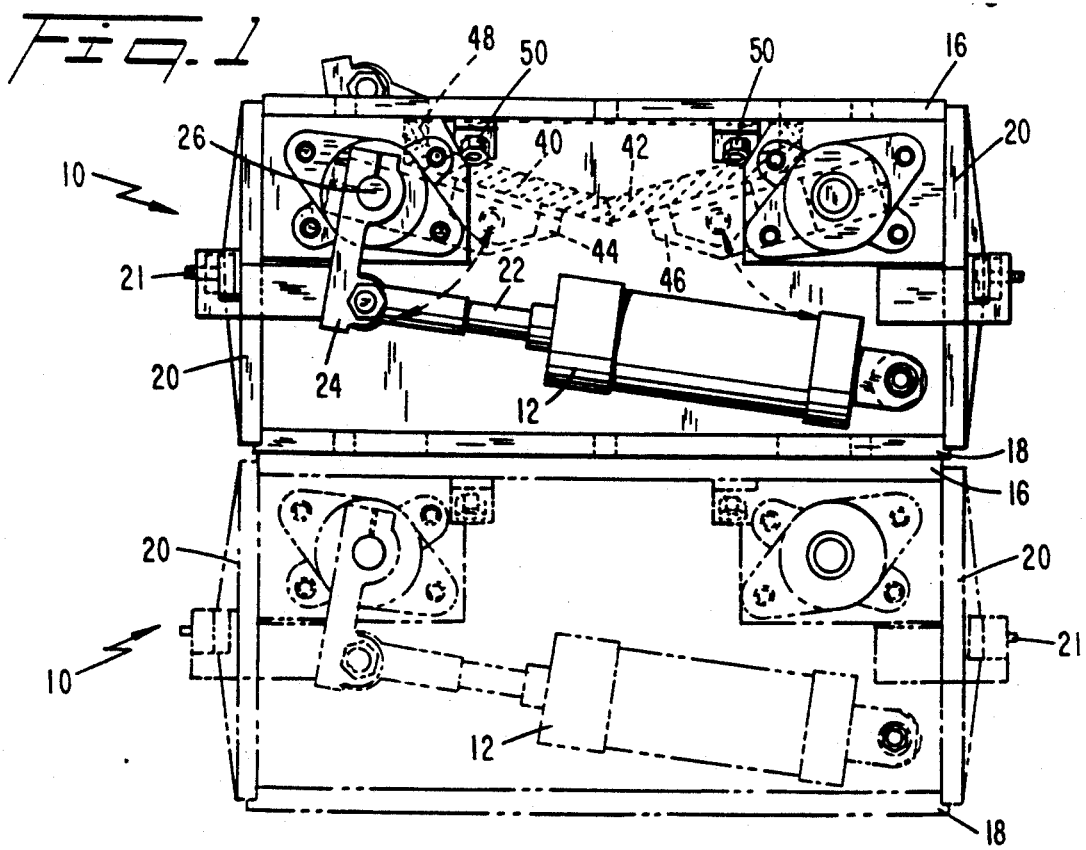

With attention to the drawings and to FIGS. 1-4 in particular, as shown in FIG. 1 two valves 10 of this invention are normally stacked and bolted together. In an airlock situation, as will be subsequently explained, the opening and closing of the valves by pistons 12 are cycled. While the means for opening and closing the valve shown is a piston 12 this invention is not intended to be limited to a pnuematic or hydrualic means for opening and closing the valves. A motor could be utilized, or an electrical means, or in fact, the valves could be opened and closed manually.

The valve 10 generally consists of a valve body 14 which defines a passage therethrough and includes upper and lower mounting rims 16 and 18. Access doors 20 are provided on either side thereof which are secured by for example bolts 21 for inspection and replacement at any worn internal parts.

The connecting rod 22 from piston 12 is pivotally attached to connecting link 24. Connecting link 24 then is rigidly secured to first actuating shaft 26.

Figure 3:
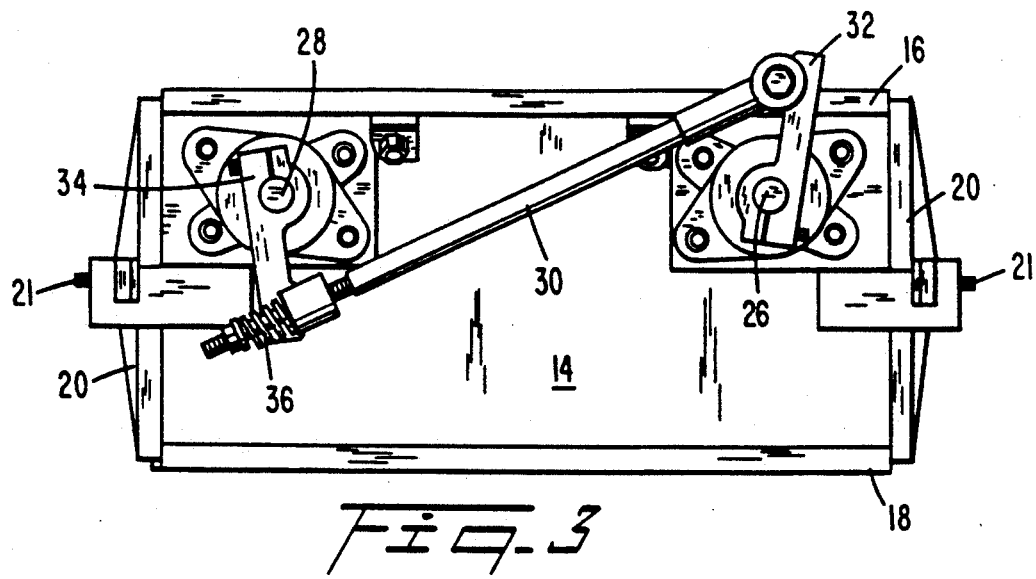
FIG. 3 is a side view of a single valve body of this invention showing the interconnection between actuator shafts.
Figure 4:
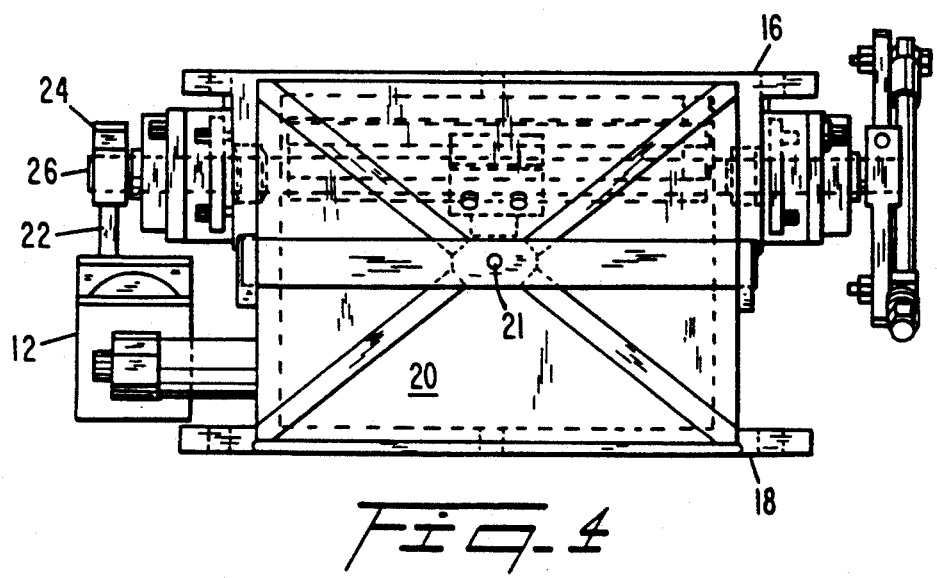
FIG. 4 is an end view of the valve body of FIG. 3.

With attention to FIG. 3, a second actuating shaft 28 is also provided. The shafts are interconnected by a rod 30 which is pivotally attached to a second connecting link 32 which is rigidly attached to shaft 26. Connecting link 34 then is pivotally attached at the opposite end of rod 30 and includes a compression spring 36 as will be subsequently explained.

Figure 2:
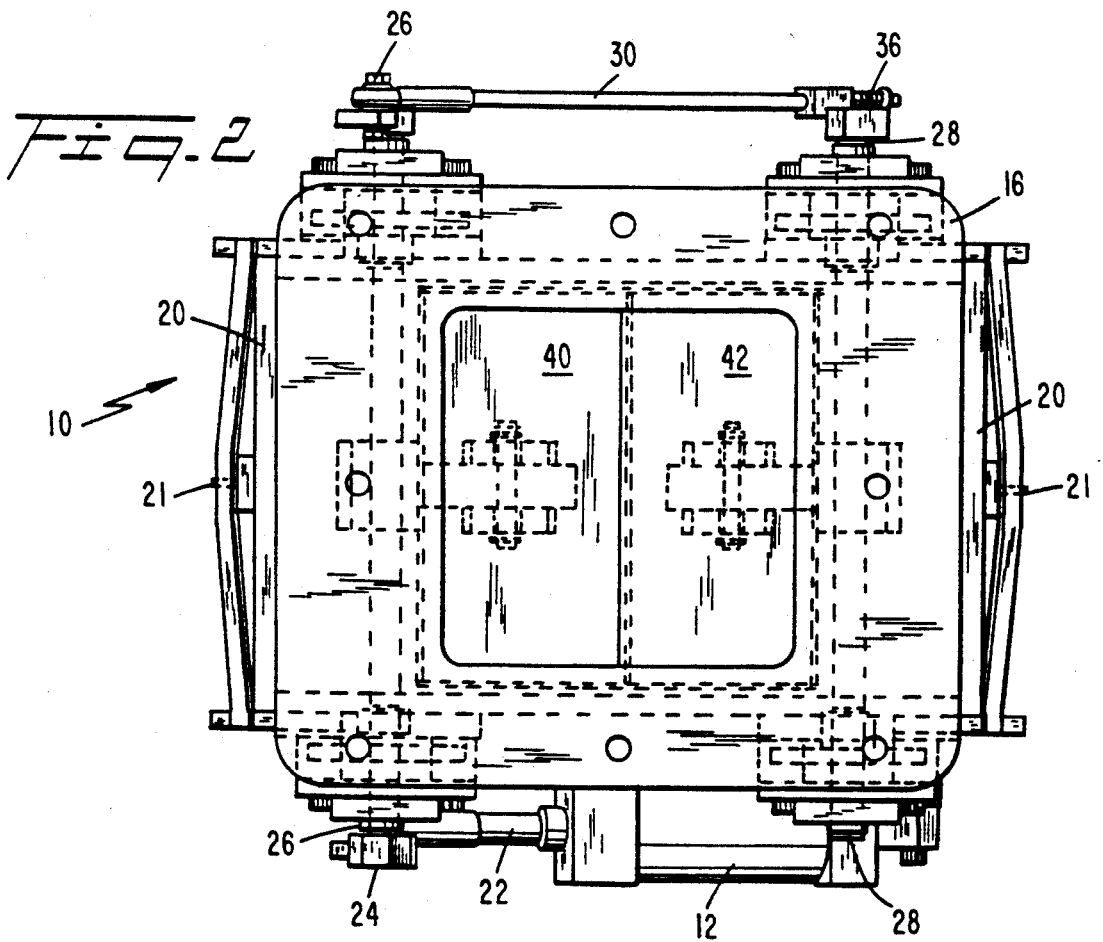
FIG. 2 is a top view of the valve system of FIG. 1.

In the embodiment of FIGS. 1 and 2 twin flapper plates 40 and 42 are pivotally mounted on actuator arms 44 and 46 which in turn are rigidly attached to, respectively, actuator shafts 26 and 28. A seat 48 is secured within valve body 14 by for example bolts 50 which are attached to upper plate 16.

Figure 5:
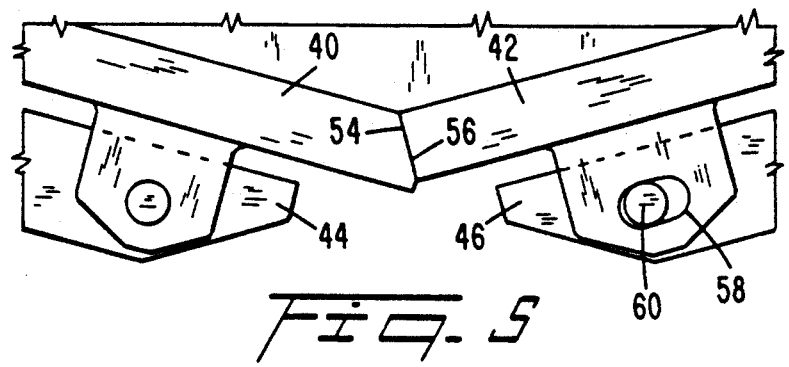
FIG. 5 is a fragmentary view illustrating the seating arrangement of an embodiment of this invention.

As shown in FIG. 5, flapper plates 40 and 42 also seat against each other at an edge. In normal operation plate 42 closes slightly ahead of plate 40 so that as the tapered edge 54 closes to seat against the opposing edge 56 of plate 42 the seating surface will be wiped clean of any particulate material. In addition, plate 42 is mounted on actuator arm 46 with an elongated slot 58 and pin 60 therein. Accordingly as plate 40 seats against plate 42, plate 42 will be urged laterally until pin 60 reaches the end of slot 58. Similarly when the valve is opened, initially plate 42 will slide forwardly as pin 60 rides in slot 58. This sliding action has been found to be helpful in jarring any bridged particulate matter loose.

In the preferred embodiment plates 40 and 42 are contained in planes disposed at an angle of 30 degrees the horizontal. similarly edges 54 and 56 are contained in planes perpendicular to and at an angle of 120 degrees respectively to the planes containing said plates.

In operation then rotational movement of shaft 26 through the action of piston 12 will result in opening or closing flapper plate 40 and similar rotation of shaft 28 to open or close plate 42. The sliding movement of flapgate 42 or 62 close first against seat 48, spring 36 compresses to allow linkage 30 to elongate to permit continued rotation of flapper 40 or 60 to close.

Figure 6:
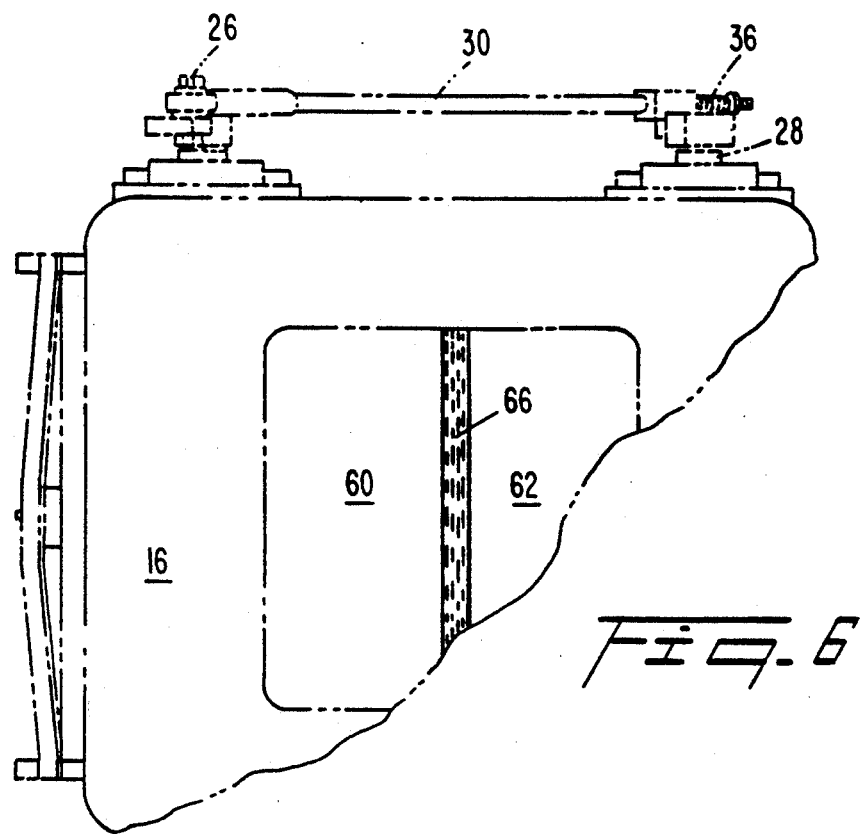
FIG. 6 is a fragmentary top view of an alternative embodiment of this ivention.
Figure 7:
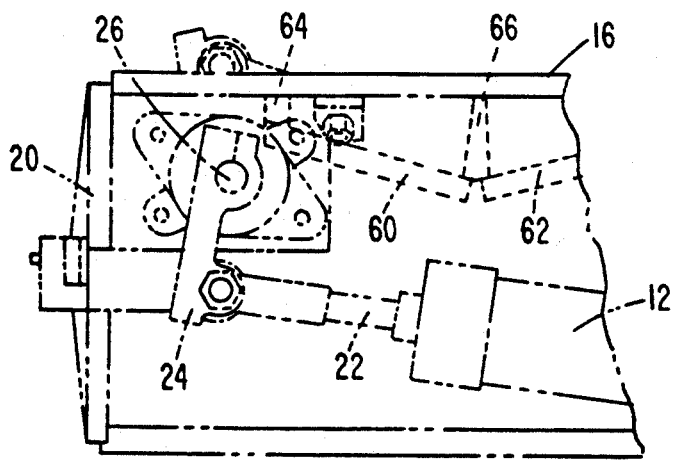
FIG. 7 is a fragmentary side view of the embodiment of FIG. 6 with the flapper plates and seat shown in phantom.

With attention to FIGS. 6 and 7, the alternative embodiment shown therein differs from the embodiment of FIGS. 1 through 5 only in the shape of the flapper plates and their seat. In that embodiment plates 60 and 62 are similarly fixed to shafts 26 and 28 (not shown). An internal seat 64 is provided with a central divider 66. Accordingly, in this embodiment the double flap 60 and 62 open and close as described relative to the embodiment of FIGS. 1-5 with the exception that they did not seat against each other.

Although the embodiments described herein are shown with a single driven shaft and a follower shaft interconnected thereto, it will be obvious to those skilled in the art that the two shafts may be separately driven if desired.

The airlock of this invention is intended to function in a conventional fashion by utilizing a pair of valves which open and close to permit the removal of particulate matter from for example a vacuum line which would be attached at upper plate 16 but is not shown herein. However, because a double flap is used the height of the valve is dramatically decreased. The valve of this invention then may for an 8 inch opening have an overall height of 16 inches which is equivalent to the headroom requirement for a rotary valve.

This invention may be embodied in other specific forms without departing from the spirit or essential characteristics thereto. The present embodiments are therefore to be considered in all respects as illustrative and restrictive, the scope of the invention being indicated by the appended claims rather than by the foregoing description, and all changes which come within the meaning and range of equivalency of the claims are therefore intended to be embraced therein.

I claim:

1. A dust or particulate material trap having a pair of dust valves coaxially mounted to each other, each dust valve comprising:

a valve body having a vertical longitudinal flow path therethrough and having an upper surface defining an entrance port;

valve seat means detachably mounted in the upper portion of said valve body around the flow path for forming a valve seat surrounding the entrance port;

first and second actuator shafts rotatably mounted on and extending through the upper portion of said body adjacent the entrance port, said shafts being disposed adjacent opposite sides of said body and means coupled to each of said shafts for rotating said shafts; first and second actuator arms disposed within said body and affixed at an end thereof, respectively, on said first and second shafts, and first and second valve flapper plates having upper and lower surfaces and mounted, respectively, at the opposite ends of said arms, said arms being disposed to rotate as said shafts rotate, upwardly to seat and downwardly to unseat the said flapper plates, to open and close the entrance port as said shafts rotate whereby said flapper plates cooperate to close said valve when seated and to open said valve when unseated; said flapper plates defining adjacent edges each contained in a plane disposed at a predetermined angle to the plane containing each of said plates said edges seating against each other when said valve is closed with said plates being contained in planes disposed at angles of about 30 degrees to the horizontal; means connecting said second flapper plate and second actuator arm for permitting sliding movement therebetween so that as said edges seat against each other to close said valve the sliding movement will tend to wipe particulate material from the edges and when said edges unseat a jarring action will be created to loosen any retained particulate material.

2. The valve of claim 1 wherein said means for rotating said shafts includes drive means coupled to said first shaft and link means coupled between said first and second shafts for rotating said second shaft responsive to rotation of said first shaft.

3. The valve of claim 2 wherein said link means includes a connecting rod.

4. The valve of claim 3 wherein said link means further comprises first and second lever arms affixed at an end thereof, respectively, to said first and second shafts the opposite ends thereof being pivotally mounted on said connecting rod.

5. The valve of claim 4 wherein the pivotal connection between said second lever arm and said connection rod is biased.

* * * * *